Oct. 6, 1936.  C. L. FORTINBERRY  2,056,181
LOCKED LICENSE PLATE
Filed April 11, 1935
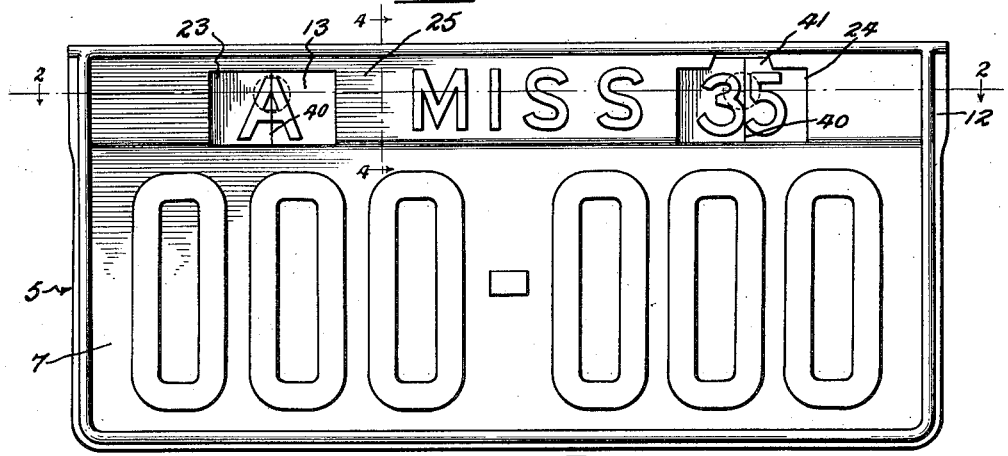
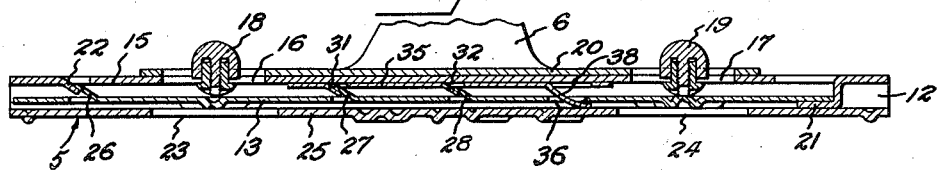
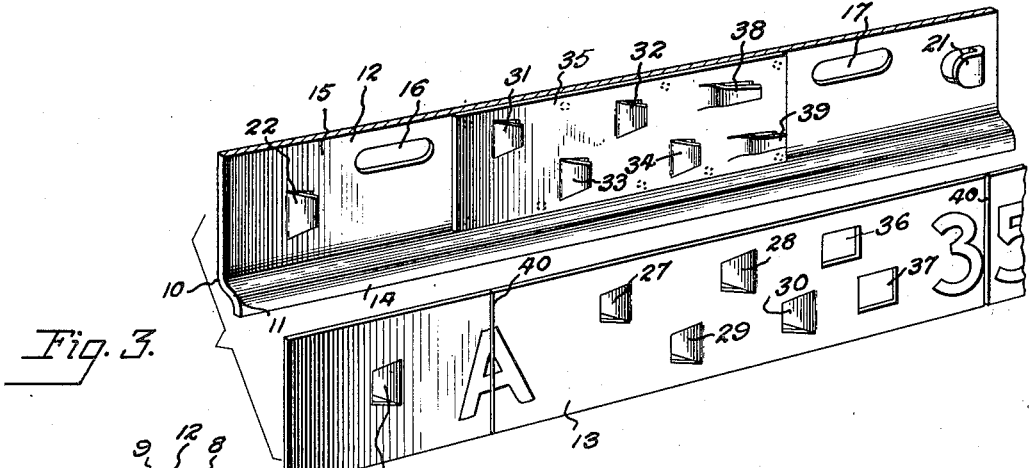
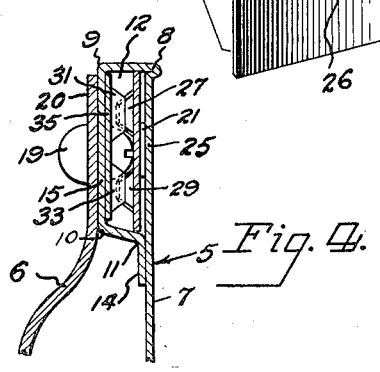
Inventor
Charles L. Fortinberry Patented Oct. 6, 1936

2,056,181

UNITED STATES PATENT OFFICE 2,056,181

LOCKED LICENSE PLATE

Charles L. Fortinberry, Washington, D. C., assignor to The Fortinberry Company, Inc., Washington, D. C., a corporation of Delaware Application April 11, 1935, Serial No. 15,874

7 Claims. (Cl. 40—125)

This invention relates to improvements in lock strip license plates of the type disclosed in my United States Patent 1,934,592, granted November 7, 1933.

The main object of the invention is to render it practically impossible for unscrupulous persons to flatten the interlocking latches used in devices of this kind, and thereby facilitate removal of the indicia-bearing license strip without mutilating the same.

Other objects of the invention will become apparent as the detailed description thereof proceeds.

In the drawing:

Figure 1 is a front elevation of the license plate with the parts thereof in assembled relation;

Figure 2 is a horizontal transverse section taken on the line 2—2 of Figure 1;

Figure 3 is an exploded perspective of the interlocking element of the license plate; and Figure 4 is a vertical transverse section, to an enlarged scale, taken on the line 4—4 of Figure 1.

Referring to the drawing, in which similar parts are designated by like numerals:

The license plate designated by the reference numeral 5 is intended to be secured to a supporting bracket 6 which is commonly provided on motor vehicles for this purpose. As in my patented construction, the plate comprises a main part 7 adapted to receive the usual license number. The upper part of the plate is bent around the lines 8, 9, 10, and 11 to form a channel 12, adapted to receive the indicia-bearing strip 13, and a flange 14 which may be suitably secured, as by welding, to the rear face of the plate 7. The rear wall 15 of the channel 12 is provided with slots 16 and 17 adapted to receive the holding devices 18 and 19 for securing the license plate as a whole to the horizontally extending part 20 of the supporting bracket 6. Preferably these holding devices are substantially the same as are illustrated in the aforesaid Letters Patent.

In the present device a stop 21 is stamped out of the rear wall 15 near one end thereof; and the locking latch 22 is similarly stamped out near the other end of the aforesaid rear wall 15. These are the only two elements which are stamped out of the material forming the rear wall 15 of the strip-receiving channel. The license strip 13 is designed to be slidably moved into the channel 12 past the latch 22 until one of its ends contacts with the stop member 21 so as to disclose its class and year indicia in the display windows 23 and 24 which are formed in the front wall 25 of the aforesaid channel 12.

The strip 13 is provided with a latch 26 adapted to interlock with the latch 22 on the rear wall of the channel 12 when the said strip is in its final display position. The strip 13 is also provided with latches 27, 28, 29, and 30 staggered with respect to each other across the width of the strip. These latches 27, 28, 29, and 30 interlock with correspondingly shaped latches 31, 32, 33, and 34, formed on a plate of steel, or other material of such resilience that the latches formed thereon cannot be flattened into the plane of the strip.

The plate 35 on which the latches 31, 32, 33, and 34 are formed, is preferably welded to the rear wall 15 of the channel 12. This construction has a decided advantage over that illustrated in my patented license plate, inasmuch as there are no openings in the rear wall of the channel through which access might be had to the latches formed on the plate 35. Preferably, also, the strip 13 is made of sheet steel, or similar resilient material, in order to ensure that the interlocking latches will spring back to normal locking position after they have been moved over each other.

As a further protection against removal of the indicia-bearing strip 13, the latter is provided with the apertures 36 and 37 adapted to receive the free end of the latches 38 and 39, respectively, which are formed on the plate 35. The latches 38 and 39 project from the plate 35 sufficiently to make contact with the front wall 25 of the channel 12 when released from pressure by engagement thereof with the strip 13. As shown clearly in Figure 2 of the drawing, these latches 38 and 39 spring into and through the apertures 36 and 37 during the movement of the plate 13 into display position. This construction is to ensure an interlock between the indicia strip and the rear wall of the channel in the event that some unscrupulous user should have broken off the latches 27, 28, 29, and 30 on the indicia strip prior to the insertion thereof in the aforesaid channel.

It is to be noted that the bases of the rows of latches on the plate 35 and the strip 13 overlap in the direction of the widths of the aforesaid plate and strip. This is to prevent the insertion of a tool, between the said rows, for the purpose of temporarily flattening the spring latches in order to effect removal of the indicia-bearing strip. While these rows of latches are separated along the widths of the members bearing the same, it is to be noted that the latch 22 on the rear wall of the channel and the cooperating latch 26 on the strip 13, are centered on the members bearing them. This arrangement serves as a further preventative for the insertion of a tool of any kind between the rows of interlocking latches aforesaid.

The indicia bearing strip is weakened along the line 40 in the manner indicated in my aforesaid patent, to facilitate removal of the strip 13 after breaking the same along the weakened line. The upper edge of the display window 24 is also provided with the recess 41, so as to expose the upper edge of the strip 13 and thereby permit a clean breaking of the strip along the line 40.

It is believed that the invention and numerous of its attendant advantages will be understood from the foregoing description; and it is obvious that changes may be made in the form, construction and arrangement of the several parts without departing from the spirit or scope of my invention, or sacrificing any of its attendant advantages, the form herein described being a preferred embodiment for the purpose of illustrating my invention.

What I claim is:

1. A license plate comprising a sheet of material having a channel formed thereon, one wall of said channel being provided with a display aperture, a plate of resilient metal hard to deform secured to the other wall of said channel, an indicia-bearing strip slidable in one direction in said channel to display its indicia through said aperture, said indicia-bearing strip and resilient plate and the sheet of material having cooperating means formed thereon to lock the indicia-bearing strip against movement from indicia display position.

2. A license plate comprising a sheet of material having a channel formed thereon, one wall of said channel being provided with a display aperture, a plate of resilient metal hard to deform secured to the other wall of said channel, an indicia-bearing strip slidable in one direction in said channel to display its indicia through said aperture, a stop in said channel engageable with one end of said strip to limit the movement thereof in said direction, said indicia-bearing strip and plate of resilient metal having interlocking tabs formed thereon to lock the strip against movement from indicia display position in the opposite direction.

3. A license plate comprising a member having a channel, one wall of said channel being provided with a display window, a stop in said channel, a license strip slidable in said channel toward said stop and having indicia thereon visible through said window when the plate is substantially in contact with said stop, a plate of resilient metal hard to deform secured to the other wall of said channel and having tabs directed toward the first named wall to one side of said window, said strip being provided with apertures to receive said tabs when the plate is in indicia display position, said tabs and apertures forming means to prevent any substantial sliding movement of the plate away from said stop when the strip is in indicia display position.

4. A license plate comprising a member having a channel, a stop in said channel, a plate of resilient metal hard to deform secured to one wall of said channel, a license strip slidable in one direction toward said stop in said channel, said resilient plate and strip having staggered rows of interlocking tabs formed thereon to lock the plate against substantial movement in the opposite direction in said channel.

5. A license plate comprising a member having a channel, a stop in said channel, a plate of resilient metal hard to deform secured to one wall of said channel, a license strip slidable in one direction toward said stop in said channel, said resilient plate and strip having staggered rows of interlocking tabs formed thereon to lock the plate against substantial movement in the opposite direction in said channel, said strip and said wall having interlocking tabs formed thereon and centered between the aforementioned staggered rows.

6. A license plate comprising a sheet of material having a channel formed thereon, one wall of said channel being provided with a display aperture, a plate of resilient metal hard to deform secured to the other wall of said channel, an indicia-bearing strip slidable in one direction in said channel to display its indicia through said aperture, said indicia bearing strip and plate of resilient metal and sheet of material being provided with cooperating means to lock the strip against substantial movement from indicia display position.

7. A license plate comprising a sheet of material having a channel formed thereon, one wall of said channel being provided with a display aperture, a plate of resilient metal hard to deform secured to the other wall of said channel, an indicia-bearing strip slidable in one direction in said channel to display its indicia through said aperture, a stop in said channel engageable with one end of said strip to limit the movement thereof in said direction, said indicia bearing strip and plate of resilient material being provided with cooperating means to lock the strip against substantial movement from indicia display position in the opposite direction.

CHARLES L. FORTINBERRY.